Feb. 5, 1929.
E. STROH
1,701,345
ANIMAL TRAP
Filed July 11, 1927
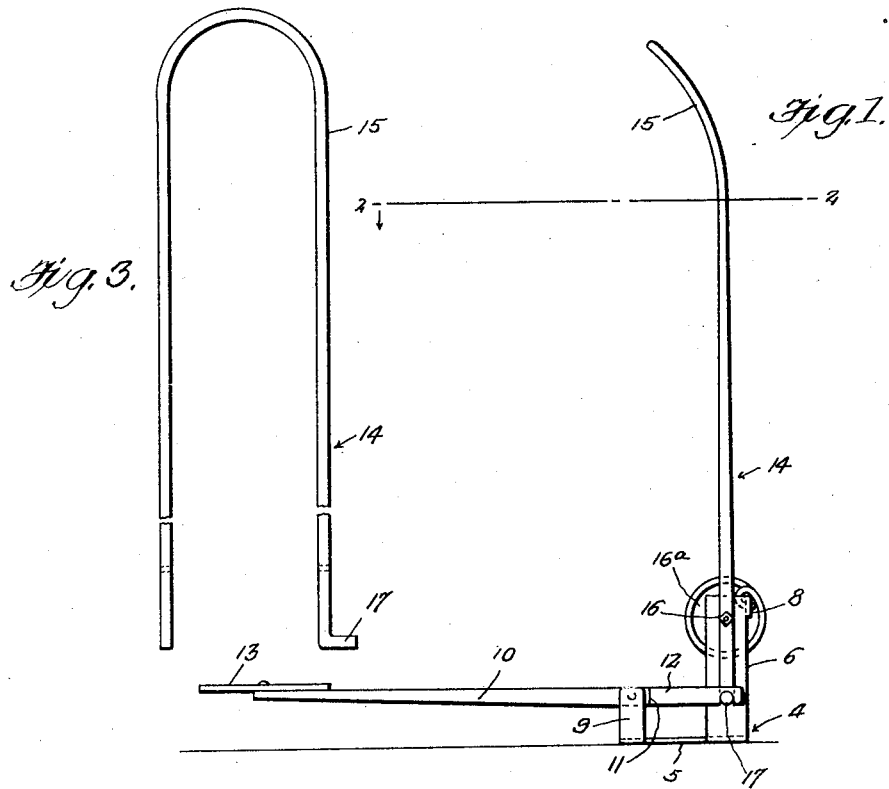
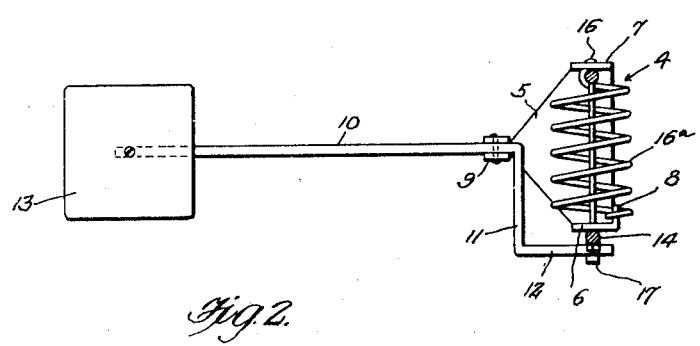
Inventor
Emerson Stroh,
By Clarence A. O'Brien
Attorney Patented Feb. 5, 1929.

1,701,345

UNITED STATES PATENT OFFICE.

EMERSON STROH, OF HUME, ILLINOIS.

ANIMAL TRAP.

Application filed July 11, 1927. Serial No. 204,830.

The present invention relates to an improved animal trap constructed with a view toward providing a structure capable of entrapping and killing an animal by an exceptionally humane way.

My principal aim is to provide a trap of this class which is characterized by features of completeness, compactness and convenience of arrangement of parts, and simplicity in construction, thereby providing a product which, it is believed, has been heretofore unequaled in the art.

I propose a structure which is such that it does not injure the fur on the animal, one which is easily concealed, light in weight, is capable of catching animals of different sizes, is simple to set and operate, and one which makes it unnecessary for the trapper to kill the animal as is ordinarily the case when common forms of traps are used.

The particular details as well as their relative arrangement and association will become more readily apparent from the following description and drawings.

In the drawings:—

Figure 1 is a side elevation of the complete device showing it set for operation.

Fig. 2 is a section on the line 2—2 of Fig. 1, and

Fig. 3 is a view of one of the important details.

One of the important parts of the invention is generally designated by the reference character 4. This comprises a substantially triangular base plate 5, the wide end of which defines a pair of spaced parallel uprights 6 and 7. At its upper end, the upright 6 is formed with a lateral extension 8 forming a pier which serves a purpose to be hereinafter described.

At the apex of the plates are short lugs 9 forming a support for a trip lever 10. The lever is pivotally mounted between these lugs at its inner end and is provided with a right angular portion 11 and a similarly bent extremity 12. The portion 12 is formed on its free end with a notch providing a hook which serves a purpose to be made plain later.

On the outer end of the lever is a foot treadle 13 in the form of a substantially square plate, suitably fastened in place. Cooperating with the base member 4 is a substantially U-shaped impact member 14.

The upper ends or bight portions 15 of this member are bent or curved along the line as indicated in the drawing, the curve being toward the foot treadle plate 13. The arms of the member 14 straddle the uprights 6 and 7 and are pivotally connected thereto by a cross bolt 16. A coiled spring 16$^a$ surrounds this bolt and has one end anchored on the pier 8 at its opposite end, connected with the lower end of one of the arms of the U-shaped member 14, as represented in Fig. 2.

As shown in the last-named figure, one of the arms is disposed inside of the upright 7 and the other one on the outside of the upright 6. The last-named arm has its extremity bent outwardly as at 17, and the hook on the end portion 12 of the lever is engageable with its bent end. The spring is so coiled as to urge the U-shaped member 14 in a direction downwardly and the spring is of sufficient force as to bring this member into engagement with the neck of the animal to give a death-dealing blow.

Under normal conditions, the device is set as represented in Fig. 1, wherein it will be observed that the impact member 14 is in a substantial vertical position, it being held here by the animal actuated trip lever. However, when an animal approaches the trap and places his foot upon the treadle plate 13, the lever will be depressed to move about the pivot in such a way as to release the impact member 14. The spring will then throw this member downwardly with sufficient force to strike the neck of the animal and kill the animal.

From the foregoing description and drawings, it will be seen that I have evolved and produced a structure which is characterized by such exclusive features, as to produce a structure which is comprehensive of the requisites of a device of this class, and embodying indispensable features insuring a structure of surpassing merit.

A consideration of the description and drawings will enable a clear understanding of the invention to be had, for which reason a more lengthy description is believed unnecessary.

Changes in shape, size and arrangement coming within the scope of the adjoined claims may be resorted to if desired.

Having thus described my invention, what I claim as new is:—

1. In a structure of the class described, a base plate, spaced uprights on the plate, a substantially U-shaped impact element having its arms cooperable with said uprights and pivotally connected thereto, a coiled spring anchored at one end upon one of said uprights, and having its opposite end cooperable with one of the arms of said impact element, said impact element having its other arm provided with an outwardly directed extremity, a foot lever pivoted on said base plate and provided at its inner end with a hook engageable with an outwardly directed end portion, and a foot plate carried by the opposite end of said lever.

2. In a structure of the class described, a base plate, spaced uprights on the plate, a substantially U-shaped impact element having its arms cooperable with said uprights and pivotally connected thereto, a coiled spring anchored at one end upon one of said uprights, and having its opposite end cooperable with one of the arms of the said impact element, said impact element having its other arm provided with an outwardly directed end portion, a trip lever provided at its inner end with a laterally disposed extension, an outward projection at the extremity of said extension, cooperative means between the end of said projection, and the bent end of one of the impact element arms for retaining the impact element in set position, said trip lever being pivotally associated with the base plate, and a foot plate carried by the opposite end of said trip lever.

In testimony whereof I affix my signature.

EMERSON STROH.